(12) United States Patent
Vance

(10) Patent No.: US 7,546,130 B2
(45) Date of Patent: Jun. 9, 2009

(54) METHODS, DEVICES, AND COMPUTER PROGRAM PRODUCTS FOR PROVIDING MULTIPLE OPERATIONAL MODES IN A MOBILE TERMINAL

(75) Inventor: Scott L. Vance, Cary, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 556 days.

(21) Appl. No.: 11/084,898

(22) Filed: Mar. 21, 2005

(65) Prior Publication Data

US 2006/0211412 A1    Sep. 21, 2006

(51) Int. Cl.
*H04W 4/00* (2009.01)

(52) U.S. Cl. ............... 455/463; 455/411; 455/415; 455/461; 455/550.1; 455/567; 379/903; 379/93.03; 715/741; 715/733

(58) Field of Classification Search .......... 455/411, 455/415, 418, 567, 461, 550.1, 463, 563; 379/551, 93.3, 903, 93.03; 715/741, 733; 709/203; 434/350
See application file for complete search history.

(56) References Cited

U.S. PATENT DOCUMENTS

| | | | |
|---|---|---|---|
| 4,640,986 A | 2/1987 | Yotsutani et al. .......... 379/60 |
| 5,148,159 A | 9/1992 | Clark et al. .......... 340/825.22 |
| 5,517,554 A | 5/1996 | Mitchell et al. | |
| 5,884,193 A | 3/1999 | Kaplan .......... 455/565 |
| 5,944,533 A | 8/1999 | Wood | |
| 6,179,682 B1 * | 1/2001 | Plain et al. .......... 446/141 |
| 6,195,568 B1 | 2/2001 | Irvin | |
| 6,456,706 B1 | 9/2002 | Blood et al. .......... 379/188 |
| 6,571,256 B1 | 5/2003 | Dorian et al. .......... 707/104.1 |
| 6,852,033 B2 * | 2/2005 | Kinjo et al. .......... 463/30 |
| 6,920,326 B2 | 7/2005 | Agarwal et al. .......... 455/445 |
| 7,058,806 B2 | 6/2006 | Smeets et al. | |
| 2002/0049806 A1 * | 4/2002 | Gatz et al. .......... 709/203 |
| 2002/0150874 A1 * | 10/2002 | Singh et al. .......... 434/340 |
| 2003/0134626 A1 * | 7/2003 | Himmel et al. .......... 455/419 |
| 2003/0139192 A1 * | 7/2003 | Chmaytelli et al. .......... 455/463 |
| 2003/0220093 A1 | 11/2003 | Fellenstein et al. .......... 455/405 |

(Continued)

FOREIGN PATENT DOCUMENTS

FR    2824219    10/2002

(Continued)

OTHER PUBLICATIONS

Hegarty "Personal Identity Password System", *Motorola Technical Developments* 39:75-76 (1999).

(Continued)

*Primary Examiner*—Edward Urban
*Assistant Examiner*—Junpeng Chen
(74) *Attorney, Agent, or Firm*—Myers Bigel Sibley & Sajovec, P.A.

(57) ABSTRACT

A method of operating a mobile terminal includes receiving mobile communications and transmitting mobile communications in a first mode of operation, and enabling at least one function that is not available in the first mode of operation while preventing transmission of mobile communications in a second mode of operation. The first mode of operation is activated responsive to receiving a valid authorization code in the second mode of operation. Related devices and computer program products are also discussed.

30 Claims, 4 Drawing Sheets

U.S. PATENT DOCUMENTS

| | | | |
|---|---|---|---|
| 2004/0082322 A1 | 4/2004 | Tani | 455/415 |
| 2004/0203601 A1 | 10/2004 | Morriss et al. | |
| 2004/0209595 A1 | 10/2004 | Bekanich | |
| 2004/0209649 A1 | 10/2004 | Lord | |
| 2005/0048998 A1* | 3/2005 | Zhu | 455/550.1 |
| 2005/0288002 A1* | 12/2005 | Sparks et al. | 455/418 |
| 2006/0161848 A1* | 7/2006 | Stabb et al. | 715/741 |

FOREIGN PATENT DOCUMENTS

| | | |
|---|---|---|
| GB | 2306120 A | 4/1997 |
| WO | 92/16078 | 9/1992 |
| WO | 2004/077797 | 9/2004 |

OTHER PUBLICATIONS

Notification of Transmittal of the International Search Report and the Written Opinion of the International Searching Authority, or the Declaration corresponding to PCT/US2005/039585 mailed on Apr. 4, 2006.

* cited by examiner

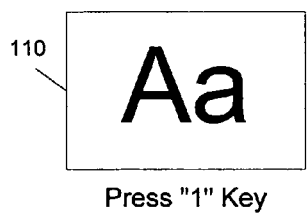
Press "1" Key
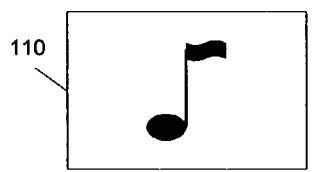
Press "2" Key
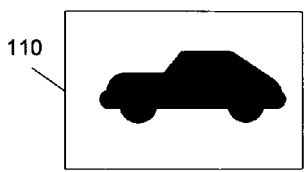
Press "3" Key
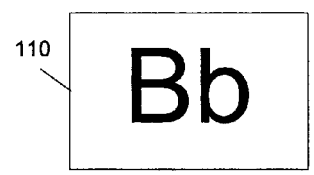
Press "1" Key a
Second Time
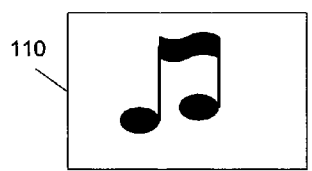
Press "2" Key a
Second Time
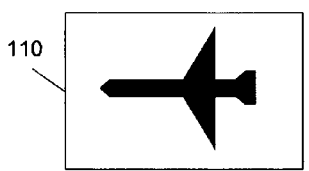
Press "3" Key a
Second Time
Press "1" Key a
Third Time
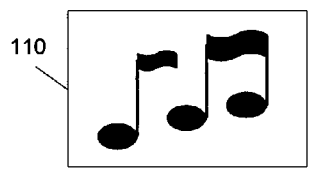
Press "2" Key a
Third Time
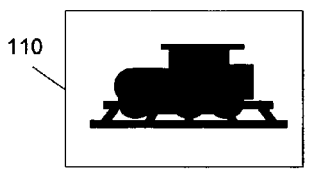
Press "3" Key a
Third Time
Figure 4A     Figure 4B     Figure 4C

METHODS, DEVICES, AND COMPUTER PROGRAM PRODUCTS FOR PROVIDING MULTIPLE OPERATIONAL MODES IN A MOBILE TERMINAL

FIELD OF THE INVENTION

The present invention relates to mobile terminals, and more particularly, to operation of mobile terminals.

BACKGROUND OF THE INVENTION

Mobile terminals are widely used for voice, data and/or multimedia communications. As used herein, mobile terminals may include conventional cell phones, Personal Communications Systems (PCS)/smart phones that may include data processing, voice, video, text message, e-mail and/or Web access capabilities, Personal Digital Assistants (PDA) with wireless communications capabilities, wireless pagers, Blackberry wireless handheld e-mail devices, and/or laptop computers and/or other devices that may include a radiotelephone transceiver.

Mobile terminals may operate to provide communication services related to voice telecommunications in addition to other services, such as internet access, email, messaging and the like. Such services are often provided by a telecommunications service provider on a usage-based pricing plan. For example, airtime charges, long distance charges, differential charges for particular services, differential charges for access to a network remote from the home provider (roaming), and the like may be associated with usage of a mobile terminal. Accordingly, undesirable costs can be incurred from unauthorized usage of the mobile terminals, which are typically portable devices that may be readily lost or misplaced.

As such, it is known to provide a lockout feature on mobile terminals. Typically, the mobile terminal includes a menu option accessible to a user allowing the user to enter a security lockout code. After entry of the code and activation of the security feature, the security code has to be entered before a user is allowed access to the services offered by the mobile terminal. For example, an owner of a lost or misplaced mobile terminal may prevent individuals who may find the mobile terminal from making use of the services provided by the mobile terminal at the expense of the owner. In addition, a parent may prevent a child from incurring charges and/or deleting information from the mobile terminal by entering the lockout code. An exemplary lockout feature is described in United States Patent Application Publication No. 2004/0082322 to Tani.

SUMMARY OF THE INVENTION

Methods of operating a mobile terminal according to exemplary embodiments of the present invention include receiving mobile communications and transmitting mobile communications in a first mode of operation, and enabling at least one function that is not available in the first mode of operation while preventing transmission of mobile communications in a second mode of operation. The first mode of operation is activated responsive to receiving a valid authorization code in the second mode of operation. In some embodiments, the second mode of operation is activated responsive to receiving a valid authorization code in the first mode of operation. For example, the first mode of operation may be a communications mode of operation, and the second mode of operation may be a child entertainment/education mode of operation.

In some embodiments, methods of operating a mobile terminal further include receiving mobile communications in the second mode of operation, and prompting a user to enter the valid authorization code responsive to receiving a mobile communication in the second mode of operation.

In other embodiments, enabling at least one function that is not available in the first mode of operation includes enabling a plurality of one-touch functions that are not available in the first mode of operation. A respective one of the plurality of one-touch functions may be activated responsive to pressing a respective button on the mobile terminal in the second mode of operation. Functions of respective buttons of the mobile terminal may be altered in the child entertainment/education mode to enable the plurality of one-touch functions that are not available in the communications mode. The plurality of one-touch functions may include a music function, a display function, a voice-repeating function, an alphabet function, and/or a karaoke function that are not available in the communications mode. In addition, a different respective music function, display function, voice-repeating function, alphabet function, and/or karaoke function may be activated responsive to repeatedly pressing a respective button.

In some embodiments, receiving a valid authorization code includes receiving the valid authorization code from a keypad and/or an input screen of the mobile terminal responsive to pressing a series of buttons on the keypad and/or responsive to selecting a plurality of menu items from a series of menus displayed on the input screen.

In other embodiments, alteration of functions, information, and/or settings for the mobile terminal may be prevented in the second mode of operation. In addition, the at least one function enabled in the second mode of operation may be pre-configured using the first mode of operation.

Mobile terminals according to exemplary embodiments of the present invention include a receiver configured to receive mobile communications at the mobile terminal, a transmitter configured to transmit mobile communications from the mobile terminal, and a mode-selection circuit. The mode-selection circuit is configured to provide a first mode of operation to receive and transmit mobile communications, and a second mode of operation to enable at least one function not available in the first mode of operation and prevent transmission of mobile communications. In addition, the mode-selection circuit is configured to activate the first mode of operation responsive to receipt of a valid authorization code in the second mode of operation. In some embodiments, the mode-selection circuit is further configured to activate the second mode of operation responsive to receipt of a valid authorization code in the first mode of operation.

In other embodiments, the mode-selection circuit is configured to enable receipt of mobile communications in the second mode of operation. The mode-selection circuit may be further configured to prompt a user to enter the authorization code responsive to receiving a mobile communication in the second mode of operation.

In some embodiments, the first mode of operation comprises a communications mode and the second mode of operation comprises a child entertainment/education mode. The mode-selection circuit may be configured to enable a plurality of one-touch functions in the child entertainment/education mode that are not available in the communications mode of operation. A respective one of the plurality of one-touch functions may be activated responsive to pressing a respective button on the mobile terminal. The mode-selection circuit may be configured to alter functions of respective buttons of the mobile terminal in the child entertainment/education mode to enable the plurality of one-touch functions that are not available in the communications mode. By way of example, the plurality of one-touch functions may include a music function, a display function, a voice-repeating function, an alphabet function, and/or a karaoke function that are not available in the communications mode. The mode-selection circuit may be further configured to activate a different respective music function, display function, voice-repeating function, alphabet function, and/or karaoke function responsive to repeatedly pressing a respective button.

In other embodiments, the mobile terminal includes a keypad including a plurality of buttons coupled to the mode-selection circuit, and an input screen coupled to the mode selection circuit. The mode-selection circuit may be configured to receive the authorization code from the keypad and/or the input screen of the mobile terminal responsive to a series of buttons pressed on the keypad and/or responsive to a plurality of menu items selected from a series of menus displayed on the input screen.

In some embodiments, the mode-selection circuit is further configured to prevent alteration of functions, information, and/or settings for the mobile terminal in the second mode of operation. In addition, the mode-selection circuit may be configured to enable user selection and/or pre-configuration of the at least one function enabled in the second mode of operation in the first mode of operation.

Computer program products for operating a mobile terminal according to exemplary embodiments of the present invention are also provided.

BRIEF DESCRIPTION OF THE DRAWINGS

FIGS. 4A to 4C illustrates exemplary child-friendly functionality enabled in a child entertainment/education mode of operation in a mobile terminal according to some embodiments of the present invention.

DETAILED DESCRIPTION

Figure 1:
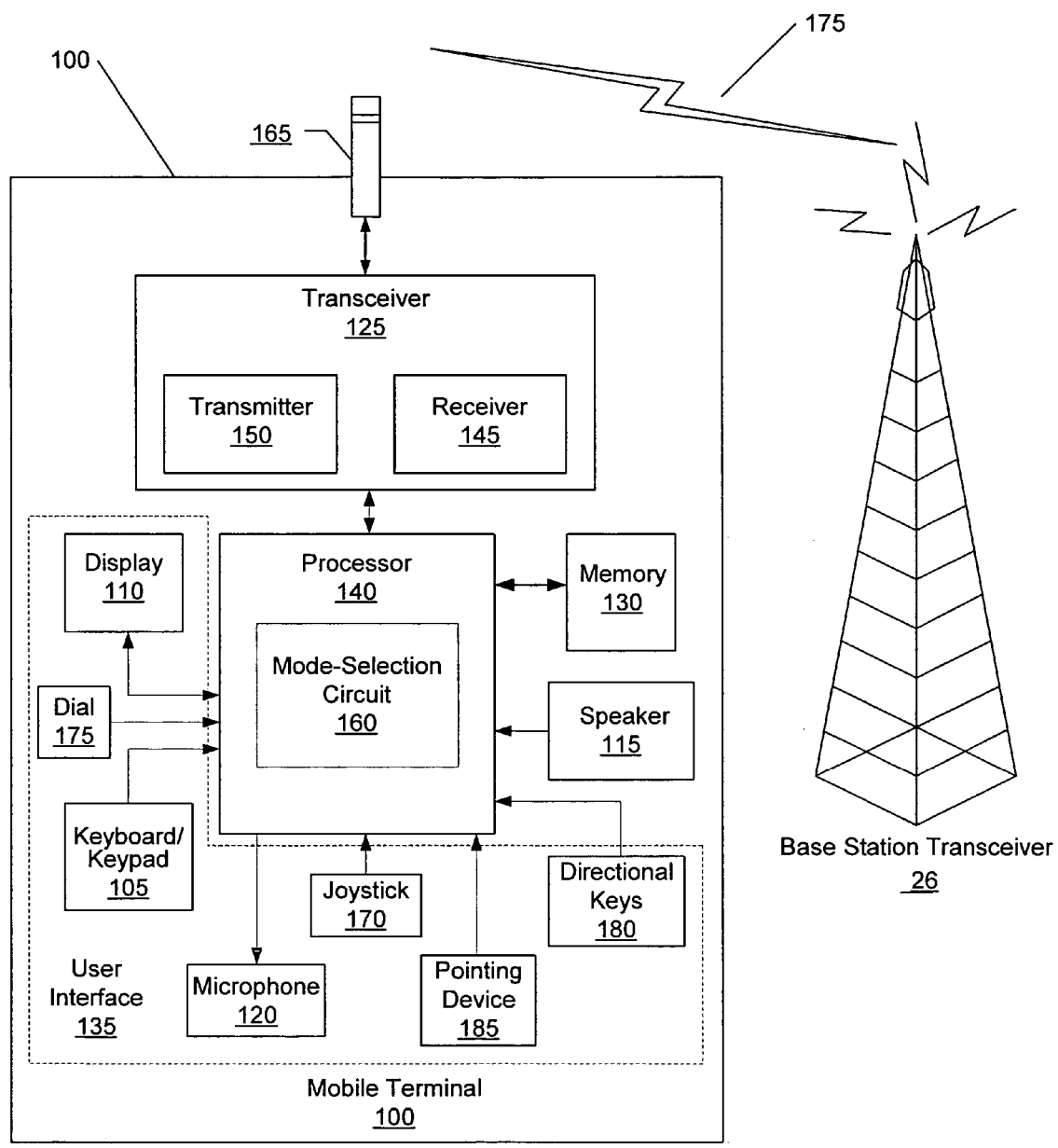
FIG. 1 is a schematic block diagram illustrating a mobile terminal according some to embodiments of the present invention.

The present invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein the term "and/or" includes any and all combinations of one or more of the associated listed items and may be abbreviated as "/".

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, regions, steps, operations, elements, and/or components, but do not preclude the presence or addition of one or more other features, regions, steps, operations, elements, components, and/or groups thereof.

As will be appreciated by one of skill in the art, the present invention may be embodied as a method, mobile terminal, or computer program product. Accordingly, the present invention may take the form of an entirely hardware embodiment, an entirely software embodiment or an embodiment combining software and hardware aspects, generally referred to herein as a "circuit."

Computer program code for carrying out operations of the present invention may be written in an object oriented programming language such as Java®, Smalltalk or C++, a conventional procedural programming languages, such as the "C" programming language, or lower-level code, such as assembly language and/or microcode. The program code may execute entirely on a single processor and/or across multiple processors, as a stand-alone software package or as part of another software package.

The present invention is described below with reference to flowchart illustrations and/or block diagrams of methods, apparatus (mobile terminals) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart illustration and/or block diagram block or blocks.

The computer program instructions may also be loaded onto a computer or other programmable data processor to cause a series of operational steps to be performed on the computer or other programmable processor to produce a computer implemented process such that the instructions that execute on the computer or other programmable processor provide steps for implementing the functions or acts specified in the flowchart illustration and/or block diagram block or blocks.

Embodiments of the present invention will now be further described with reference to the schematic block diagram illustration of a mobile terminal 100 in FIG. 1. FIG. 1 illustrates a mobile terminal 100 transmitting and/or receiving a wireless communications signal 175. The mobile terminal 100 may include a network transceiver 125, an antenna 165, memory 130, a speaker 115, and a user interface 135 coupled to a processor 140. Depending on the particular functionalities offered by the mobile terminal 100, the user interface 135 may include a keyboard/keypad 105, a display 110, a microphone 120, a joystick 170, a dial 175, a directional key(s) 180, and/or a pointing device 185 (such as a mouse, track ball, touch pad, etc.). However, additional and/or fewer elements of the user interface 135 may actually be provided.

The network transceiver 125 typically comprises a transmitter 150 and a receiver 145, which are respectively configured to transmit outgoing radio frequency signals to a base station transceiver 26 of a wireless communication network and to receive incoming radio frequency signals from the base station transceiver 26 via the antenna 165. While a single antenna 165 is shown in FIG. 1, it is to be understood that multiple antennas and/or different types of antennas may be utilized based on the types of signals being received. The radio frequency signals transmitted between the mobile terminal 100 and the base station transceiver 26 may comprise both traffic and control signals (e.g., paging signals/messages for incoming calls), which are used to establish and maintain communication with another party or destination, and may provide uplink and/or downlink communications. However, the present invention is not limited to such two-way communication systems.

With respect to their role in various conventional operations of the mobile terminal 100, the foregoing components of the mobile terminal 100 may be included in many conventional mobile terminals and their functionality is generally known to those skilled in the art. It should be further understood, that, as used herein, the term "mobile terminal" may include a cellular radiotelephone with or without a multi-line display; a Personal Communications System (PCS) terminal that may combine a cellular radiotelephone with data processing, facsimile and data communications capabilities; a Personal Data Assistant (PDA) that can include a radiotelephone, pager, Internet/intranet access, Web browser, organizer, calendar and/or a global positioning system (GPS) receiver; and a conventional laptop and/or palmtop receiver and/or other device that includes a radiotelephone transceiver.

Also shown in the mobile terminal 100 of FIG. 1 is a mode-selection circuit 160 that, as illustrated in FIG. 1, may be implemented in the processor 140. However, it is to be understood that the mode-selection circuit 160 may also be a separate circuit operatively coupled as described herein to various other components of the mobile terminal 100. The mode-selection circuit 160 is configured to provide first and second modes of operation for the mobile terminal 100. More specifically, the mode selection circuit 160 is configured to provide a first mode of operation to receive and transmit mobile communications, and a second mode of operation to enable at least one function not available in the first mode of operation while preventing transmission of mobile communications. The mode-selection circuit 160 is configured to activate the first mode of operation responsive to receipt of a valid authorization code in the second mode of operation.

For example, the first mode of operation may be a conventional wireless communications and/or telephone mode for transmitting and receiving wireless communications, while the second mode of operation may be a child entertainment/education mode for providing child-friendly functions that are not available in the first mode while disabling the transmitter 150 of the mobile terminal 100. As such, children may entertain themselves with the child-friendly functionality in the second mode without the ability to make outgoing calls and/or otherwise incur costs/charges from the service provider. However, the receiver 145 may be enabled in the second mode of operation, so that an owner/user of the mobile terminal may still be alerted to incoming calls even when a child is using the mobile terminal 100 in the second mode. Responsive to receiving an incoming call at the receiver 145 while in the second mode of operation, the mode-selection circuit 160 may be configured to prompt the owner to enter the authorization code to return to the first mode of operation and answer the incoming call. In addition, the mode-selection circuit may be configured to prevent alteration of functions, information, and/or settings for the mobile terminal 100 in the second mode of operation. As such, children may be prevented from altering and/or erasing contact lists, phone numbers, and or other information stored in the memory 130 while the mobile terminal 100 is in the second mode.

The functions enabled by the mode-selection circuit 160 in the second mode of operation that are not available in the first mode of operation may include multiple one-touch functions that can be activated responsive to pressing a respective button on the keypad 105, directional keys 180, and/or other input device of the mobile terminal 100. As such, the mode-selection circuit 160 may be configured to alter the functions provided by the respective buttons of the mobile terminal 100 in the first mode in order to enable the one-touch functions in the second mode. For example, the one-touch functions enabled in a child entertainment/education mode may include child-friendly functions such as a music function, a display function, a voice-repeating function, an alphabet function, and/or a karaoke function that are not available in a communications mode. In addition, a different function may be activated responsive to repeatedly pressing a respective button. For instance, pressing the "1" key once in the second mode of operation may activate a music function which plays a popular children's song via the speaker 115 of the mobile terminal 100, while pressing the "1" key twice may activate a different children's song. The functions enabled in the second mode of operations, such as the child-friendly functions described above, may be pre-configured (i.e., initially configured and/or selected) by an owner of the mobile terminal 100 in the first mode of operation. As such, a parent may assign particular music, display, alphabet, and/or other child-friendly functions to be enabled in the child entertainment/education mode to particular buttons on the mobile terminal 100 prior to activating the child entertainment/education mode.

The mode-selection circuit 160 may include and/or may be operatively coupled to various user input/output devices such as the display 110 (which may be a touchscreen supporting both input and output) and the keyboard/keypad 105 to obtain input from a user as well as to prompt a user in order to obtain desired information. For example, the mode-selection circuit 160 may be configured to receive a valid authorization code from the keyboard/keypad 105 and/or the display/input screen 110 of the mobile terminal 100 in the second mode of operation to activate the first mode of operation. More particularly, the mode selection circuit 160 may receive the authorization code responsive to a sequence of buttons pressed on the keypad 105 and/or responsive to a sequence of menu items selected from a series of menus displayed on the input screen 110. The authorization code may be defined by the user, and may require multiple user actions that are highly unlikely to be activated by a child. For example, the authorization code may require a complex sequence of buttons and/or menu selections that are unlikely to reproduced by a child. Thus, the mode selection circuit 160 may be configured to prevent access to the first mode of operation once the mobile terminal 100 is in the second mode of operation. In addition, the mode selection circuit 160 may be configured to activate the second mode of operation responsive to receiving a valid authorization code in the first mode of operation. The valid authorization code required by the mode selection circuit 160 to activate the first mode of operation may be the same as or different from the valid authorization code required to activate the second mode of operation.

The mode-selection circuit 160 may thus provide first and second modes of operation for the mobile terminal 100 that are targeted to different audiences. For example, first and second modes of operation according to some embodiments of the present invention may allow a parent or other user to conventionally operate the mobile terminal to transmit and receive wireless communications in the first mode, while allowing a child or other user to use additional functions for entertainment in the second mode of operation without the risk of incurring charges and/or losing data stored in the mobile terminal 100. As such, various functions of the mobile terminal 100 related to the transmitter 150 may be unavailable in the second mode, such as call placement in a roaming mode, long distance call placement and/or placement of calls to specified area codes where additional air access times may apply, internet access, multimedia messaging access, e-mail access, and the like. In some embodiments, exceptions could be provided, for example, for emergency (E911) calls. In addition, various functions of the mobile terminal 100 related to the memory 130 may also be unavailable in the second mode, such as call history, contact lists, ring tones, settings, and the like. Thus, in the second mode of operation, unauthorized charges and/or loss of data stored in the mobile terminal 100 may be prevented while providing additional functionality, such as for children's entertainment.

Figure 2:
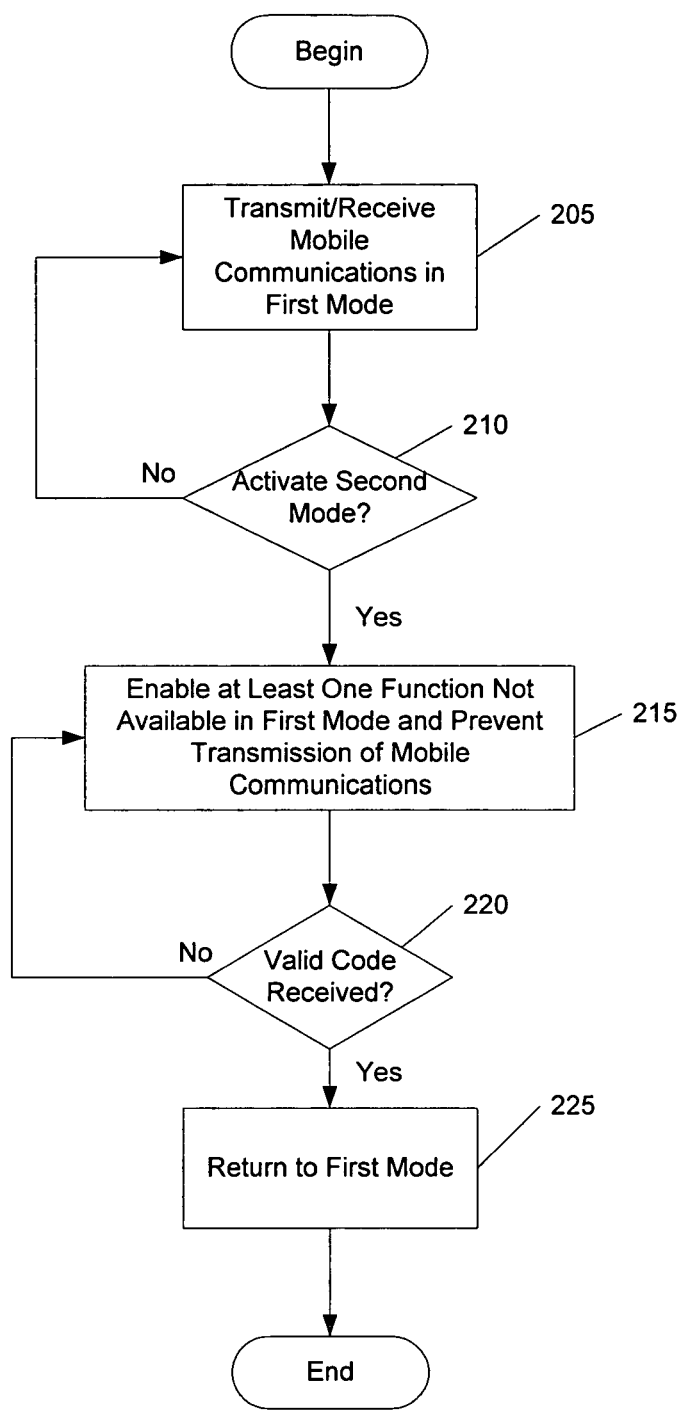
FIG. 2 is a flowchart illustrating exemplary operations for operating a mobile terminal in first and second modes according to some embodiments of the present invention.
Figure 3:
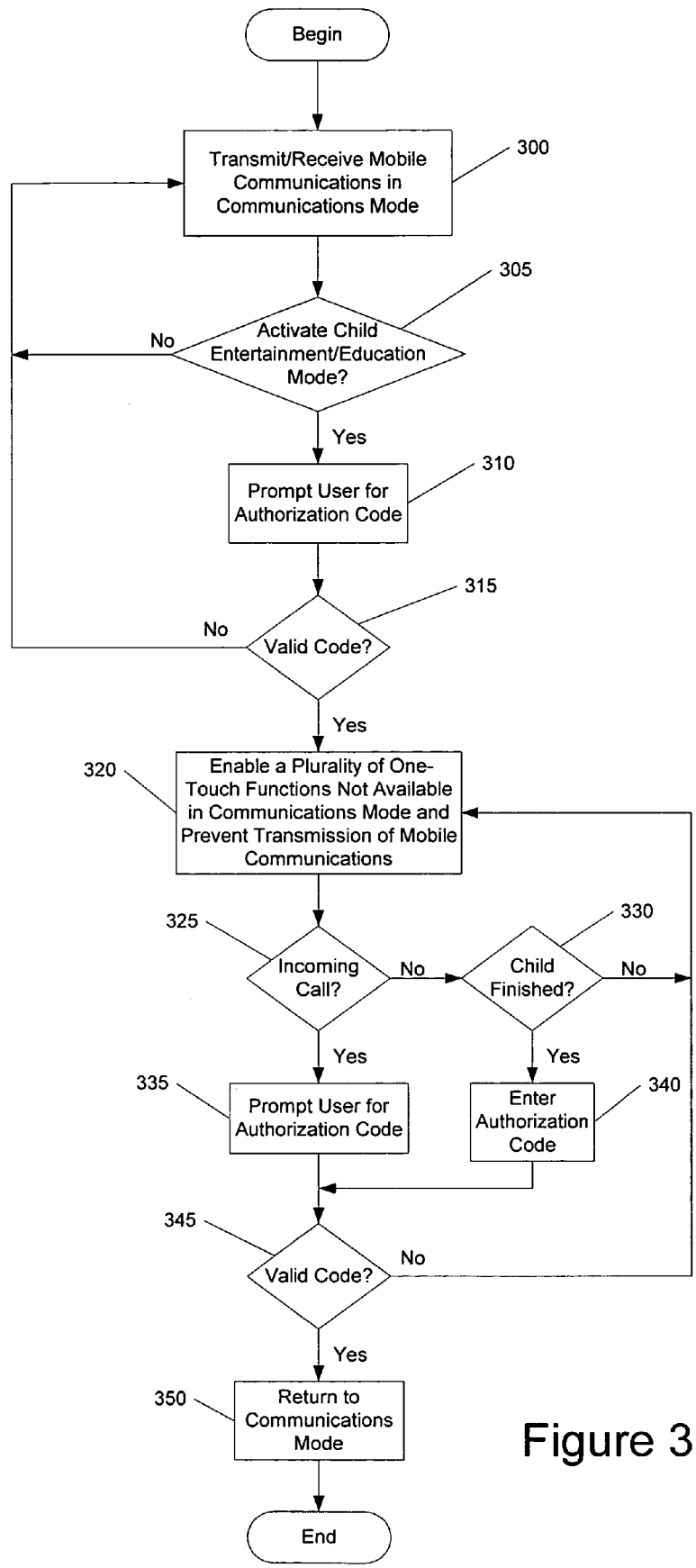
FIG. 3 is a flowchart illustrating exemplary operations for operating a mobile terminal in a communications mode and a child entertainment/education mode according to further embodiments of the present invention.

FIGS. 2 and 3 are flowcharts illustrating exemplary operations that may be performed by a mobile terminal, or more specifically, by the mode-selection circuit 160 of mobile terminal 100, according to some embodiments of the present invention. Operations related to providing multiple operational modes in a mobile terminal according to some embodiments of the present invention will now be described with reference to the flowchart of FIG. 2. As shown in FIG. 2, operations begin at Block 205, where the mobile terminal transmits and receives mobile communications in a first mode of operation. For example, the first mode of operation may be a conventional wireless communications mode for transmitting and receiving calls over a wireless network. If desired, a second mode of operation (Block 210) may be activated. In some embodiments, the second mode of operation may be activated responsive to receiving a valid authorization code in the first mode of operation. In the second mode of operation, at least one function that is not available in the first mode is enabled, and transmission of mobile communications from the mobile terminal is prevented (Block 215). In addition, alteration of functions, information, and/or settings for the mobile terminal may be prevented in the second mode. For example, the second mode of operation may be a child entertainment/education mode, where multiple child-friendly functions are enabled which are not available in the first mode. If a valid authorization code is received while in the second mode of operation (Block 220), the first mode of operation is activated (Block 225). As such, the mobile terminal returns to transmitting and receiving mobile communications. Alternatively, if an invalid authorization code is received (Block 220), the mobile terminal remains in the second mode of operation (Block 215). As such, transmission of mobile communications from the mobile terminal is prevented until a valid authorization code is entered.

Additional operations for providing multiple operational modes in a mobile terminal according to some embodiments of the present invention will now be described with reference to the flowchart of FIG. 3. More specifically, FIG. 3 illustrates particular embodiments for providing a communications mode of operation and a child entertainment/education mode of operation in a mobile terminal. As shown in FIG. 3, operations begin at Block 300 where the mobile terminal transmits and receives mobile communications in a communications mode of operation. The communications mode may be a conventional mode of operating a mobile terminal to transmit and receive wireless communications. If desired, a user may activate a child entertainment/education mode of operation (Block 305) in order to entertain a child. The child entertainment/education mode may enable additional child-friendly functionality that is not available in the communications mode. In some embodiments, the user may select and/or pre-configure such child-friendly functionality using the communications mode. For example, a parent could select from a list of available songs/music stored in the memory of the mobile terminal and assign chosen songs to a particular button and/or buttons on the mobile terminal.

Still referring to FIG. 3, a user is prompted for an authorization code to enable the child entertainment/education mode at Block 310. The authorization code is then verified (Block 315) and, if invalid, operations return to the communications mode at Block 300. However, if the provided authorization code is valid (Block 315), the child entertainment/education mode is activated, for example, by the mode-selection circuit 160 of FIG. 1. As such, a plurality of one-touch functions that are not available in the communications mode are enabled, and transmission of mobile communications is prevented (Block 320). A respective one of the plurality of enabled one-touch functions may be activated responsive to pressing a respective button on the mobile terminal, such as a button on the keyboard/keypad 105, joystick 170, directional keys 180, and/or other devices included in the user interface 135. As such, functions of the respective buttons on the mobile terminal may be altered to provide the plurality of one-touch functions. The one-touch functions may include, for example, a music function, a display function, a voice-repeating function, an alphabet function, and/or a karaoke function that are not available in the communications mode. Moreover, repeatedly pressing a respective button may activate a different respective music function, display function, voice-repeating function, alphabet function, and/or karaoke function. Also, functions, information, settings, and/or other data stored in the memory 130 of the mobile terminal may not be altered while in the child entertainment/education mode.

In addition, incoming mobile communications may be received at the mobile terminal in the child entertainment/education mode. If an incoming call is received while in child entertainment/education mode (Block 325), a user is prompted to enter an authorization code (Block 335) to activate the communications mode and answer the call. The authorization code to activate the communications mode while in the child entertainment/education mode may be the same as or different from the authorization code to activate the child entertainment/education mode while in the communications mode. The authorization code may be received from the keypad 105 and/or input screen 110 of the mobile terminal responsive to pressing a series of buttons on the keypad 105 and/or responsive to selecting a plurality of menu items from a series of menus displayed on the input screen 110. If a valid authorization code is entered (Block 345), operations return to the communications mode (Block 350), enabling both transmit and receive functionality so that the incoming call can be answered. However, if an invalid code is entered, operations return to the child entertainment/education mode (Block 320), preventing the call from being answered. Likewise, when a child is finished playing with the mobile terminal (Block 330), an authorization code is entered by a user (Block 340). For example, directions for exiting the child entertainment/education mode, such as "press *64 to exit", may be shown in small font on the input screen 110 of the mobile terminal. When the displayed string is entered by the user, the user may be prompted to enter the authorization code. If the code is valid (Block 345), operations return to the communications mode (Block 350). If the code is invalid (Block 345), operations return to the child entertainment/education mode (Block 320).

As such, the mobile terminal remains in the child entertainment/education mode until a valid authorization code is entered (Block 345). The authorization code may be set and/or chosen to require multiple user actions that are highly unlikely to be duplicated by a child. In addition, the number of opportunities provided to enter a valid authorization code may be limited in order to increase the difficulty of a frequent user, such as a child, from determining the authorization code by trial-and-error. This may prevent an unauthorized party from exiting the child entertainment/education mode, and thus, from transmitting calls and/or altering data stored in the memory 130 of the mobile terminal. As such, functionality associated with the transmitter 150 of the mobile terminal, such as internet access services, long distance calls, roaming calls, and/or calls to a specified area code, e-mail, text messaging, and the like may be unavailable in the child entertainment/education mode. As discussed above, in some embodiments, exceptions may be allowed, such as allowing placement of emergency calls.

The flowcharts of FIGS. 2 and 3 illustrate the architecture, functionality, and operation of possible implementations of systems, devices, and computer program products for providing multiple modes of operation in a mobile terminal according to embodiments of the present invention. In this regard, each block in the flow charts or block diagrams may represent a module, segment, or portion of code, which comprises one or more executable instructions for implementing the specified logical act(s). It should also be noted that, in some alternative implementations, the acts noted in the blocks may occur out of the order noted in the figures. For example, two blocks shown in succession may, in fact, be executed substantially concurrently, or the blocks may sometimes be executed in the reverse order, depending upon the functionality involved.

Exemplary child-friendly functionality that may be enabled in a second mode of operation in mobile terminals according to some embodiments of the present invention are illustrated in FIGS. 4A to 4C. FIG. 4A illustrates an alphabet function that may be enabled in a child entertainment/education mode of a mobile terminal, such as the mobile terminal 100 of FIG. 1. Referring now to. FIG. 4A, when a parent or other user of a mobile terminal activates the child entertainment/education mode of the mobile terminal, a one-touch alphabet function is enabled. More specifically, the function of the "1" key on the keypad 105 is altered to provide the alphabet function. As such, when a child presses the "1" key, capital and/or lowercase versions of the letter "A" is shown on the display 110 of the mobile terminal. In some embodiments, a synthesized and/or recorded voice may also say the letter "A" responsive to pressing the "1" key, via the speaker 115 of the mobile terminal. When the child presses the "1" key a second time, capital and/or lowercase versions of the letter "B" is shown on the display 110, and a voice may say the letter "B" via the speaker 115. Similarly, when the child presses the "1" key a third time, capital and/or lowercase versions of the letter "C" is shown on the display 110, and a voice may say the letter "C" via the speaker 115. The remaining letters of the alphabet may be activated by repeatedly pressing the "1" key a corresponding number of times. Particular alphabet letters may be activated by consecutively pressing the "1" key a number of times within a given period, or the alphabet letters may be activated sequentially each time the "1" key is pressed. For example, in some embodiments, the child may be able to directly activate the letter "Z" by rapidly pressing the "1" key 26 times. Alternatively, the child may be required to activate each letter of the alphabet in sequence in order to activate the letter "Z". As discussed above, a parent may select and/or pre-configure such preferences in the communications mode of operation prior to activating the child entertainment/education mode.

FIG. 4B illustrates a music function that may be enabled in the child entertainment/education mode of operation. The music function may be enabled simultaneously with the alphabet function of FIG. 4A by assigning the music function to a different key on the keypad. More specifically, referring to FIG. 4B, the function of the "2" key on the keypad 105 is altered to provide the music function in the child entertainment/education mode. The music function may activate a particular musical note or an entire musical tune responsive to pressing the "2" key. For example, when a child presses the "2" key, a first musical tune is broadcast via the speaker 115 of the mobile terminal. In some embodiments, words and/or musical notes corresponding to the first tune may also be shown on the display 110 of the mobile terminal 100 responsive to pressing the "2" key, thereby providing a karaoke function. When the child presses the "2" key a second time, a second tune that is different from the first tune may be broadcast via the speaker 115 and words/notes corresponding to the second tune may be shown on the display 110. Likewise, when the child presses the "2" key a third time, a third tune different from the first and second tunes may be broadcast via the speaker 115 and corresponding words/notes may be shown on the display 110. The particular tunes available in the child entertainment/education mode may be selected from a list of tunes stored in the memory 130 and assigned to a specific key on the keypad 105 using the communications mode of operation. Alternatively, each of the keys on the keypad 105 may be assigned a different note, to enable a piano function in the child entertainment/education mode.

In addition to the above-described child-friendly functions, FIG. 4C illustrates a "see-and-say" function that may be enabled in the child entertainment/education mode of operation simultaneously with the alphabet and music functions of FIGS. 4A and 4B, respectively. Referring now to FIG. 4C, the function of the "3" key on the keypad 105 of the mobile terminal is altered to provide the see-and-say function. As such, when a child presses the "3" key, a picture of a car is shown on the display 110 of the mobile terminal. A synthesized and/or recorded voice may also say the word "car" responsive to pressing the "3" key, via the speaker 115 of the mobile terminal. When the child presses the "3" key a second time, a picture of a plane is shown on the display 110 and a voice may say the word "plane" via the speaker 115. Similarly, when the child presses the "3" key a third time, a picture of a train is shown on the display 110 and a voice may say the word "train" via the speaker 115. Additional vehicles, animals, and/or other items may be provided by repeatedly pressing the "3" key.

Although specific child-friendly functions have been described above with reference to FIGS. 4A to 4C, additional functionality that is not available in the communications mode may be enabled in the child entertainment/education mode. For example, a voice-recording function may be enabled in the child entertainment/education mode, where a child says a word and/or phrase into the microphone 120 of the mobile terminal, and the word/phrase is recorded and repeated via the speaker 115 responsive to pressing a respective button on the keypad 105. In addition, while the one-touch functions described above are activated by repeatedly pressing a single key, it is to be understood that a parent/user may set the plurality of one-touch functions as desired using the communications mode of operation. For example, the parent may pre-configure each key on the keypad to activate a different display function, rather than repeatedly pressing the same key to activate the different display functions.

In the drawings and specification, there have been disclosed typical illustrative embodiments of the invention and, although specific terms are employed, they are used in a That which is claimed is:

1. A method of operating a mobile terminal, the method comprising:
   receiving mobile communications and transmitting mobile communications in a first mode of operation;
   enabling at least one child entertainment/education function that is not available in the first mode of operation and preventing transmission of mobile communications in a second mode of operation;
   receiving a mobile communication in the second mode of operation;
   prompting a user to enter a valid authorization code responsive to receiving the mobile communication in the second mode of operation; and
   activating the first mode of operation responsive to receiving the valid authorization code in the second mode of operation.

2. The method according to claim 1, wherein the valid authorization code comprises a first valid authorization code, and further comprising:
   activating the second mode of operation responsive to receiving a second valid authorization code in the first mode of operation.

3. The method according to claim 1, wherein enabling the at least one child entertainment/education function comprises:
   enabling a plurality of one-touch functions that are not available in the first mode of operation, a respective one of which is activated responsive to pressing a respective button on the mobile terminal in the second mode of operation,
   wherein the first mode of operation comprises a communications mode, and wherein the second mode of operation comprises a child entertainment/education mode.

4. The method according to claim 3, further comprising:
   altering functions of respective buttons of the mobile terminal in the child entertainment/education mode to enable the plurality of one-touch functions that are not available in the communications mode.

5. The method according to claim 3, wherein the plurality of one-touch functions comprises a music function, a display function, a voice-repeating function, an alphabet function, and/or a karaoke function that are not available in the communications mode.

6. The method according to claim 5, further comprising:
   activating a different respective music function, display function, voice-repeating function, alphabet function, and/or karaoke function responsive to repeatedly pressing a respective button.

7. The method according to claim 1, wherein receiving the valid authorization code comprises:
   receiving the valid authorization code from a keypad and/or an input screen of the mobile terminal responsive to pressing a series of buttons on the keypad and/or responsive to selecting a plurality of menu items from a series of menus displayed on the input screen.

8. The method according to claim 1, further comprising:
   preventing alteration of information and/or settings for the mobile terminal in the second mode of operation.

9. The method according to claim 1, further comprising:
   pre-configuring the at least one child entertainment/education function enabled in the second mode of operation using the first mode of operation.

10. The method according to claim 1, wherein preventing transmission of mobile communications in the second mode of operation comprises disabling a transmitter of the mobile terminal in the second mode of operation.

11. A mobile terminal, comprising:
   a receiver configured to receive mobile communications at the mobile terminal;
   a transmitter configured to transmit mobile communications from the mobile terminal; and
   a mode-selection circuit configured to provide a first mode of operation to receive and transmit mobile communications and a second mode of operation to enable at least one child entertainment/education function not available in the first mode of operation and to prevent transmission of mobile communications,
   wherein the mode-selection circuit is configured to enable receipt of mobile communications in the second mode of operation, prompt a user to enter a valid authorization code responsive to receipt of a mobile communication in the second mode of operation, and activate the first mode of operation responsive to receipt of the valid authorization code in the second mode of operation.

12. The mobile terminal according to claim 11, wherein the valid authorization code comprises a first valid authorization code, and wherein the mode-selection circuit is further configured to activate the second mode of operation responsive to receipt of a second valid authorization code in the first mode of operation.

13. The mobile terminal according to claim 11, wherein the first mode of operation comprises a communications mode, wherein the second mode of operation comprises a child entertainment/education mode, and wherein the mode-selection circuit is configured to enable a plurality of one-touch functions in the child entertainment/education mode that are not available in the communications mode of operation, a respective one of which is activated responsive to pressing a respective button on the mobile terminal.

14. The mobile terminal according to claim 13, wherein the mode-selection circuit is configured to alter functions of respective buttons of the mobile terminal in the child entertainment/education mode to enable the plurality of one-touch functions that are not available in the communications mode.

15. The mobile terminal according to claim 13, wherein the plurality of one-touch functions comprises a music function, a display function, a voice-repeating function, an alphabet function, and/or a karaoke function that are not available in the communications mode.

16. The mobile terminal according to claim 15, wherein the mode-selection circuit is further configured to activate a different respective music function, display function, voice-repeating function, alphabet function, and/or karaoke function responsive to repeatedly pressing a respective button.

17. The mobile terminal according to claim 11, further comprising:
   a keypad including a plurality of buttons coupled to the mode-selection circuit; and
   an input screen coupled to the mode selection circuit,
   wherein the mode-selection circuit is configured to receive the authorization code from the keypad and/or the input screen of the mobile terminal responsive to a series of buttons pressed on the keypad and/or responsive to a plurality of menu items selected from a series of menus displayed on the input screen.

18. The mobile terminal according to claim 11, wherein the mode-selection circuit is further configured to prevent alteration of information and/or settings for the mobile terminal in the second mode of operation.

19. The mobile terminal according to claim 11, wherein the mode-selection circuit is configured to enable user pre-configuration of the at least one child entertainment/education function enabled in the second mode of operation in the first mode of operation.

20. The device according to claim 11, wherein the mode-selection circuit is configured to disable the transmitter in the second mode of operation to prevent transmission of mobile communications.

21. A computer program product for operating a mobile terminal, the computer program product comprising:
- a computer readable storage medium having computer readable program code embodied in the medium, the computer readable program code comprising:
- computer readable program code configured to enable transmission and receipt of mobile communications in a first mode of operation;
- computer readable program code configured to enable at least one child entertainment/education function that is not available in the first mode of operation and prevent transmission of mobile communications in a second mode of operation;
- computer readable program code configured to enable receipt of mobile communications in the second mode of operation;
- computer readable program code configured to prompt a user to enter a valid authorization code responsive to receipt of a mobile communication in the second mode of operation; and
- computer readable program code configured to activate the first mode of operation responsive to receipt of the valid authorization code in the second mode of operation.

22. The computer program product according to claim 21, wherein the valid authorization code comprises a first valid authorization code, and further comprising:
- computer readable program code configured to activate the second mode of operation responsive to receipt of a second valid authorization code in the first mode of operation.

23. The computer program product according to claim 21, wherein the first mode of operation comprises a communications mode, wherein the second mode of operation comprises a child entertainment/education mode, and wherein computer readable program code configured to enable the at least one child entertainment/education function comprises:
- computer readable program code configured to enable a plurality of one-touch functions that are not available in the communications mode, a respective one of which is activated responsive to pressing a respective button on the mobile terminal in the child entertainment/education mode.

24. The computer program product according to claim 23, further comprising:
- computer readable program code configured to alter functions of respective buttons of the mobile terminal in the child entertainment/education mode to enable the plurality of one-touch functions that are not available in the communications mode.

25. The computer program product according to claim 23, wherein the plurality of one-touch functions comprises a music function, a display function, a voice-repeating function, an alphabet function, and/or a karaoke function that are not available in the communications mode.

26. The computer program product according to claim 25, further comprising:
- computer readable program code configured to activate a different respective music function, display function, voice-repeating function, alphabet function, and/or karaoke function responsive to repeatedly pressing a respective button.

27. The computer program product according to claim 21, further comprising:
- computer readable program code configured to receive the valid authorization code from a keypad and/or an input screen of the mobile terminal responsive to a series of button pressed on the keypad and/or responsive to a plurality of menu items selected from a series of menus displayed on the input screen.

28. The computer program product according to claim 21, further comprising:
- computer readable program code configured to prevent alteration of information and/or settings for the mobile terminal in the second mode of operation.

29. The computer program product according to claim 21, further comprising:
- computer readable program code configured to enable user pre-configuring of the at least one child entertainment/education function enabled in the second mode of operation using the first mode of operation.

30. The computer program product according to claim 21, wherein the computer readable program code configured to prevent transmission of mobile communications in the second mode of operation comprises computer readable program code configured to disable a transmitter of the mobile terminal in the second mode of operation.

* * * * *